United States Patent
Neumann et al.

(10) Patent No.: US 8,457,103 B2
(45) Date of Patent: Jun. 4, 2013

(54) METHOD AND SYSTEM FOR SYNCHRONIZATION OF AT LEAST TWO TERMINAL COMMUNICATION SYSTEMS AND AT LEAST ONE COUNTERPART COMMUNICATION STATION WITHIN A MULTI-STANDARD WIRELESS COMMUNICATION SYSTEM

(75) Inventors: Markus Neumann, Nuremberg (DE); Christian Wuensch, Roethenbach a.d. Pegnitz (DE)

(73) Assignee: ST Ericsson SA, Plan-les-Ouates (CH)

( * ) Notice: Subject to any disclaimer, the term of this patent is extended or adjusted under 35 U.S.C. 154(b) by 576 days.

(21) Appl. No.: 12/615,151

(22) Filed: Nov. 9, 2009

(65) Prior Publication Data

US 2010/0113014 A1    May 6, 2010

Related U.S. Application Data

(63) Continuation-in-part of application No. PCT/IB2008/051669, filed on Apr. 30, 2008.

(30) Foreign Application Priority Data

May 9, 2007 (EP) .................................... 07107823

(51) Int. Cl.
*H04J 3/06* (2006.01)

(52) U.S. Cl.
USPC ........... 370/350; 370/347; 370/321; 370/324; 370/503; 370/395.62; 455/502

(58) Field of Classification Search
USPC ............ 370/350, 342–347, 321–324, 395.62, 370/503, 507–514, 520; 455/502, 208, 265
See application file for complete search history.

(56) References Cited

U.S. PATENT DOCUMENTS

| | | | |
|---|---|---|---|
| 7,039,438 B2 * | 5/2006 | Khlat | 455/552.1 |
| 7,649,968 B2 * | 1/2010 | Barber et al. | 375/354 |
| 2001/0055980 A1 * | 12/2001 | Sato | 455/552 |
| 2002/0054627 A1 | 5/2002 | Asikainen | |
| 2004/0037379 A1 | 2/2004 | Khlat | |
| 2006/0276154 A1 * | 12/2006 | Kaewell, Jr. | 455/258 |
| 2008/0085693 A1 | 4/2008 | Harms | |
| 2009/0227248 A1 | 9/2009 | Chance et al. | |

FOREIGN PATENT DOCUMENTS

| | | | |
|---|---|---|---|
| EP | 1206039 A2 * | 5/2002 | |
| GB | 2387507 A | 10/2003 | |
| GB | 2425233 A | 10/2006 | |
| WO | 02/104050 A1 | 12/2002 | |
| WO | 2005/069661 A1 | 7/2005 | |

* cited by examiner

*Primary Examiner* — Marcos Torres
(74) *Attorney, Agent, or Firm* — Potomac Patent Group PLLC

(57) ABSTRACT

A method synchronizes plural terminal communication systems and a counterpart communication station connected via a radio link within a multi-standard wireless communication system, wherein a counterpart transmission signal is transmitted from said counterpart communication station to the corresponding terminal communication system. A common reference clock signal is generated and supplied to a signal generation unit within said terminal communication system, wherein each terminal communication system comprises a conversion ratio unit having a conversion ratio. An accurate frequency datum is derived from each counterpart transmission signal in the terminal communication systems and a frequency control signal is determined from said accurate frequency datum. A synchronization between said terminal communication stations and counterpart communication station is obtained by adjusting the frequency of the common reference clock signal and/or the conversion ratio of said conversion ratio units according to the frequency control signal.

9 Claims, 7 Drawing Sheets

METHOD AND SYSTEM FOR SYNCHRONIZATION OF AT LEAST TWO TERMINAL COMMUNICATION SYSTEMS AND AT LEAST ONE COUNTERPART COMMUNICATION STATION WITHIN A MULTI-STANDARD WIRELESS COMMUNICATION SYSTEM

BACKGROUND

1. Technical Field

The disclosure generally relates to the field of multi-standard wireless communication systems and especially to communication terminals applicable for different broadcast and communication standards. These communication terminals are further referred to as multi-standard wireless communication terminals.

2. Description of the Related Art

In recent years different wireless communication standards such as Universal Mobile Telecommunications Systems (UMTS), General System for Mobile Communications (GSM), Wireless Local Area Network (WLAN), Time Division Synchronous Code Division Multiple Access (TD-SCDMA) and Bluetooth have been developed for various wireless communication applications.

To use communication services supported by at least two different communication standards so-called multi-standard wireless communication terminals have been developed supporting at least two different air interfaces. In many cases, these multi-standard wireless communication terminals support multi-system operations, e.g. they are capable of transmitting voice or data on different supported wireless communication standards. Sometimes, even multi-standard handovers, e.g. a transition between the systems during a call, are supported, for example between GSM and WLAN.

Such a multi-standard wireless communication terminal consists of a variety of different terminal communication systems, each supporting a specific broadcast ("one-way") and/or communication ("two-way") standard. Said different terminal communication systems of a multi-standard wireless communication terminal may have their own reference clock unit to produce an own reference clock signal. Having a variety of different communication units in a single terminal communication system, it is always desirable to share as much as possible units and components. Therefore, preferably a common reference clock unit may be shared by all terminal communication systems within a multi-standard wireless communication terminal producing one common reference clock signal. While having a common reference clock unit, a unified automatic frequency control (AFC) is used.

From US 2004/0037379 A1 a multi-standard radio communication terminal is known, using a shared clock source for providing simultaneous time base monitoring for GSM/TDMA/EDGE using accumulator type layer 1 timers.

WO 2005/069661 A1 describes a method of synchronizing a first and a second time base unit in a multi-standard receiving station consisting of several time base units to provide different clock signals for the supported transmission standards, wherein one of said time base units acts as a "master" time base unit. Said "master" time base unit is calibrated and the calibration datum is reused for the calibration and synchronization of the remaining time base units.

WO 02/104050 A1 discloses a method for synchronizing a multi-standard base station using one clock, wherein the system to be synchronized are GSM- or EDGE-type telecommunication systems. The clock of the WCDMA-type system is selected as the system clock of the multi-standard base station and the clock of the GSM-type system is using multiples of the frequency of the selected clock. One clock again acts as a master clock for both systems.

Said architectures according to the state of the art use a master system, having a continuously working clock control, which is typically not the case for TDMA-standards like GSM, IS136 etc. Furthermore, said architectures are not suited for low cost and low power multi-standard wireless communication terminals, as each terminal communication system uses its own reference clock unit increasing the size of the electronic design as well as the design costs and power consumption of the design.

FIG. 1 shows per way of example a block diagram of an architecture of a multi-standard wireless communication system WTS according to the state of the art consisting of several radio communication systems RCS1-RCSn.

Each of said radio communication systems RCS1-RCSn enables at least a data broadcast from a counterpart communication station CCS1-CCSn, located upstream of each radio link RL1-RLn, via at least one radio link RL1-RLn to a multi-standard wireless communication terminal located downstream of each radio link RL1-RLn and including several terminal communication stations CS1-CSn. In addition to said downstream communication, also an upstream data communication between said terminal communication stations CS1-CSn and at least one counterpart communication station CCS1-CCSn can be provided. The radio link RL1-RLn is established between an antenna A1-An connected to said terminal communication stations CS1, CS2-CSn and a counterpart antenna CA1-CAn attached to said counterpart communication stations CCS1, CCS2-CCSn.

Each terminal communication station CS1, CS2-CSn includes a signal generation unit SGU1-SGUn, a signal conversion unit SCU1-SCUn, a reference clock unit RCU1-RCUn and a clock control unit CCU1-CCUn. The signal generation unit SGU1-SGUn is attached to the signal conversion unit SCU1-SCUn, which is connected to said antenna A1-An as well as to said clock control unit CCU1-CCUn. Furthermore, the reference clock unit RCU1-RCUn is associated with the signal generation unit SGU1-SGUn and the clock control unit CCU1-CCUn.

In conventional architectures said signal generation unit SGU1-SGUn is a phase locked loop (PLL) circuit that includes for example a phase-frequency-detector, a loop-filter, a voltage-controlled-oscillator and a conversion ratio unit CRU1-CRUn, which may be realized by a integer divider unit, a frac-N divider unit or a divider unit working according to a further division technique. Furthermore said signal generation unit SGU1-SGUn maybe realized as a "direct-digital-synthesis" (DDS) system.

The frequency synthesis done by said signal generation unit SGU1-SGUn is based on a reference clock signal rcs1-rcsn provided by the reference clock unit RCU1-RCUn. Each signal generation unit SGU1-SGUn generates a conversion signal cs1-csn that is supplied to the attached signal conversion unit SCU1-SCUn, which may be realized by a mixer unit often accompanied by a low noise amplifier unit (not shown in the figures).

This signal conversion unit SCU1-SCUn is connected to the antenna A1-An for the transmission of at least one transmission signal ts1-tsn via said radio link RL1-RLn to the counterpart communication stations CCS1-CCSn. The transmission signal ts1-tsn is received by the counterpart antenna CA1-CAn of said counterpart communication station CCS1-CCSn. In addition to that a counterpart transmission signal ts1'-tsn' is transmitted from the counterpart communication stations CCS1-CCSn to the terminal communication stations CS1-CSn comprising an accurate frequency datum ac1-acn via the radio link RL1-RLn. The accurate frequency datum ac1-acn contained in said counterpart transmission signal ts1'-tsn' is received by the signal conversion unit SCU1-SCUn and converted in the baseband frequency domain. Subsequently the converted accurate frequency datum ac1-acn is provided to the clock control unit CCU1-CCUn.

Depending on the reference clock signal rcs1-rcsn provided by the reference clock unit RCU1-RCUn to the clock control unit CCU1-CCUn, the frequency error/frequency offset of the reference clock signal rcs1-rcsn is determined by analyzing the accurate frequency datum ac1-acn provided by the counterpart communication station CCS1-CCSn and received via said counterpart transmission signal ts1'-tsn'. Based on the analysis of said accurate frequency datum ac1-acn with respect to the reference clock signal rcs1-rcsn a frequency-error control signal fec1-fecn is generated by the clock control unit CCU1-CCUn, which is fed to the reference clock unit RCU1-RCUn to control the frequency of the reference clock signal rcs1-rcsn in order to minimize the calculated frequency error. The connection between each reference clock unit RCU1-RCUn and the attached clock control unit CCU1-CCUn is realized as a simple digital clock unit or/and a local reference signal which is used for frequency comparison with said accurate frequency datum ac1-acn.

FIG. 2 shows a further prior art architecture of a different multi-standard wireless communication system WTS utilizing, instead of one reference clock unit RCU1-RCUn per terminal communication system CS1-CSn, one common reference clock unit RCU for all terminal communication systems CS1-CSn, that is controlled by one of the terminal communication systems CS1-CSn via a single clock control unit CCU. Said common reference clock unit RCU originates a common reference signal rcs, which is provided to each terminal communication system CS1-CSn, wherein said common reference clock unit RCU maybe integrated in one of said radio communication system RCS1-RCSn or may be realized as an external unit.

Via the single clock control unit CCU a common frequency error control signal cfec is created and supplied to the common reference clock unit RCU. According to FIG. 2, said common reference clock unit RCU is per way of example attached to the first terminal communication station CS1, which comprises the common clock control unit CCU as well.

So, contrary to the system architecture depicted in FIG. 1, the further terminal communication stations CS2-CSn according to FIG. 2 comprise neither an own reference clock unit CRU2-CRUn nor an own clock control unit CCU2-CCUn. If the radio link RL1 associated with the first terminal communication station CS1 comprising the common clock control unit CCU is unstable or doesn't have a high accuracy, the whole radio communication within the multi-standard wireless communication system WTS might fail due to the still existing frequency error.

BRIEF SUMMARY

One embodiment provides a method and a system for the synchronization of at least two terminal communication systems with at least one counterpart communication station in a multi-standard wireless communication system overcoming the technical drawbacks mentioned above.

One embodiment provides a method and a system allowing time discontinuous operation of the clock control unit, in order to achieve a continuous synchronization within said multi-standard wireless data communication terminal, even when its dedicated communication link is interrupted or has temporally bad transmission quality.

One embodiment is a method for the synchronization of at least two terminal communication systems and at least one counterpart communication station being connected via a radio link within a multi-standard wireless communication system, wherein at least one counterpart transmission signal is transmitted from said at least one counterpart communication station to the corresponding terminal communication system comprising the following steps:

generating at least one common reference clock signal;

supplying said at least one common reference clock signal to at least one signal generation unit within said terminal communication systems, wherein each terminal communication system comprises a conversion ratio unit having a given conversion ratio;

deriving at least one accurate frequency datum from said at least one counterpart transmission signal in the terminal communication systems;

determining at least one frequency control signal from said accurate frequency datum or from at least one frequency control signal derived from said accurate frequency datum and obtaining synchronization between at least one of said terminal communication systems and the corresponding counterpart communication station by adapting the frequency of the common reference clock signal and/or the conversion ratio of at least one of said conversion ratio units according to the determined frequency control signal.

One embodiment is multi-standard wireless communication system comprising of at least two radio communication systems, each including a terminal communication system and a counterpart communication station being connected via at least one radio link, wherein at least one counterpart transmission signal is transmitted from each counterpart communication station to the corresponding terminal communication system comprising:

a common reference clock unit for the generation of at least one common reference clock signal;

a signal generation unit arranged in each terminal communication system comprising a conversion ratio unit having a given conversion ratio, wherein said at least one common reference clock signal is supplied to said signal generation units of the different terminal communication systems;

a signal conversion unit arranged in each terminal communication system for deriving at least one accurate frequency datum from each counterpart transmission signal;

at least one clock control unit for determining at least one frequency control signal from said accurate frequency datum or from at least one frequency control signal derived from said accurate frequency datum, wherein synchronization between at least one of said terminal communication systems and one of said corresponding counterpart communication terminals is obtained by adapting the frequency of the common reference clock signal and/or the conversion ratio of said conversion ratio units according to the determined frequency control signal.

Advantageously, said frequency control signal is provided even during the sleep modes of some radio communication systems, respectively TDMA systems or during synchronization lost or by corrupted radio links. Furthermore, the frequency control precision is increased by using frequency control signal of other highly accurate systems. Also a frequency control is provided for systems without inherently frequency correction loops.

Further advantageously said method enables a higher integration capability by reducing the number of components, power and costs.

These and other aspects of the disclosure are apparent from and will be elucidated with reference to the embodiments described hereinafter.

BRIEF DESCRIPTION OF THE SEVERAL VIEWS OF THE DRAWINGS

The disclosure will be described in greater detail hereinafter, by way of non-limiting examples, with reference to the embodiments shown in the drawings.

DETAILED DESCRIPTION

Figure 1:
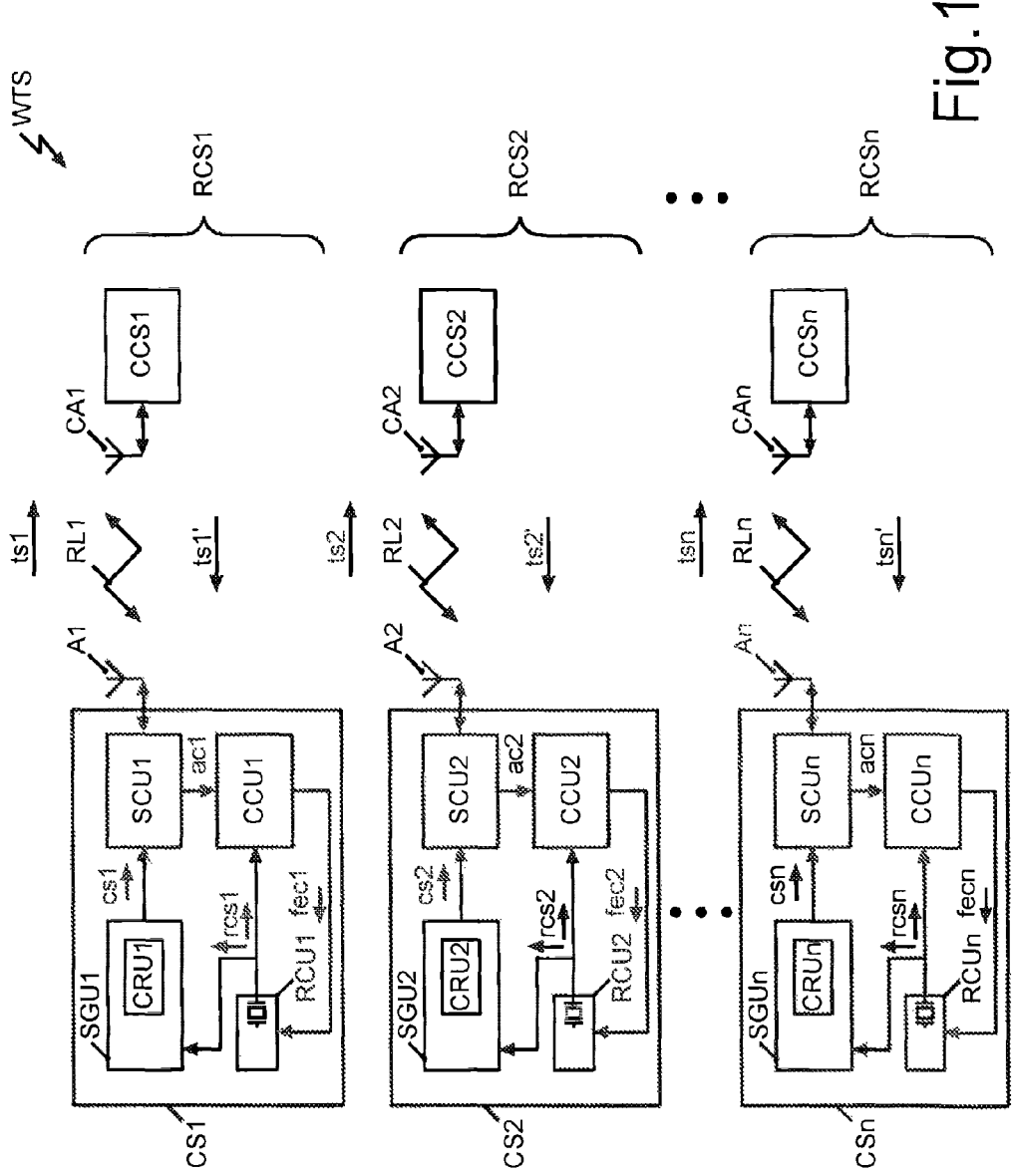
FIG. 1 shows a block diagram of a prior art architecture of a multi-standard wireless communication system consisting of several communication systems, each having a own reference clock unit.
Figure 2:
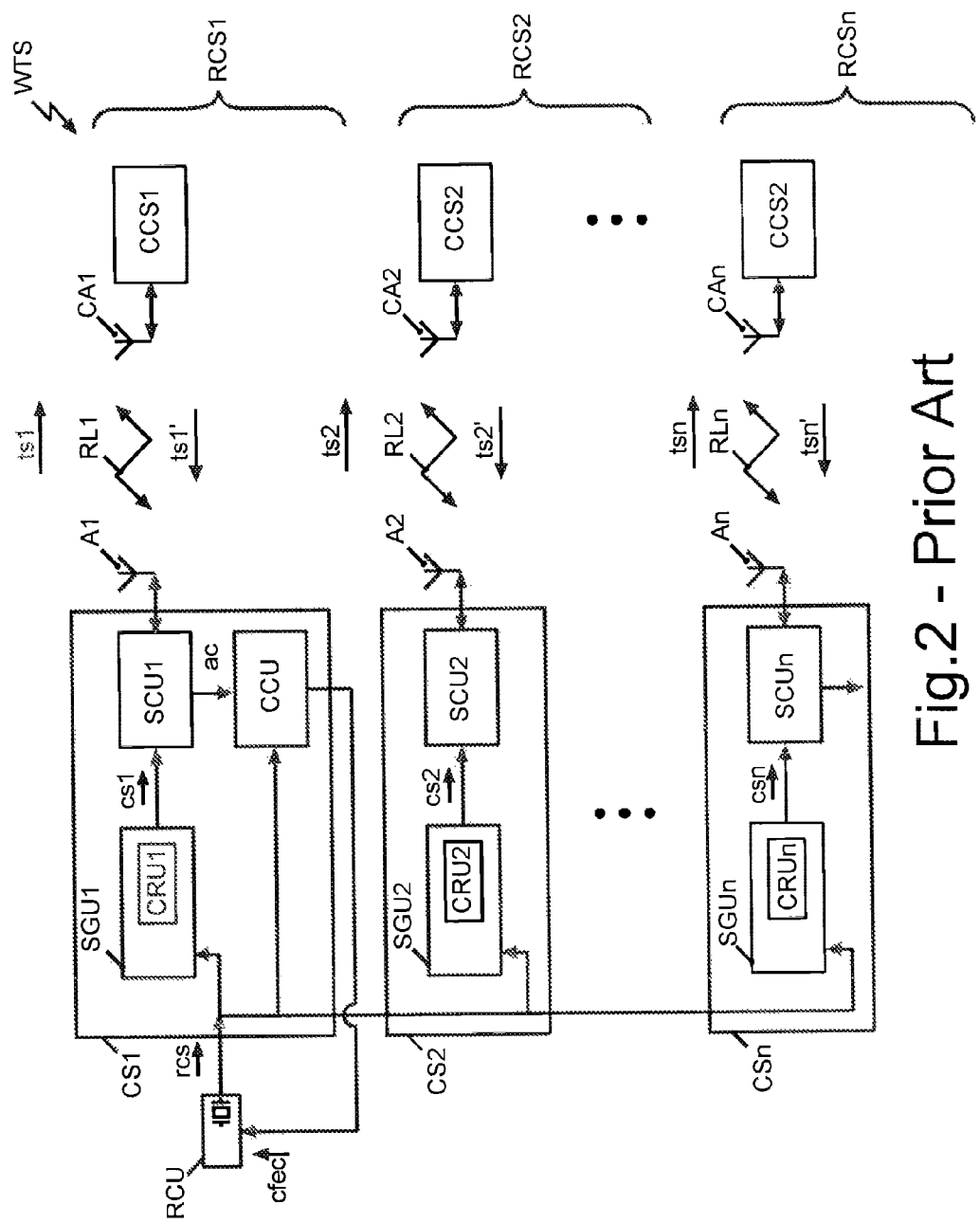
FIG. 2 shows a block diagram of a further similar prior art architecture of a different system utilizing one common reference clock unit.
Figure 3:
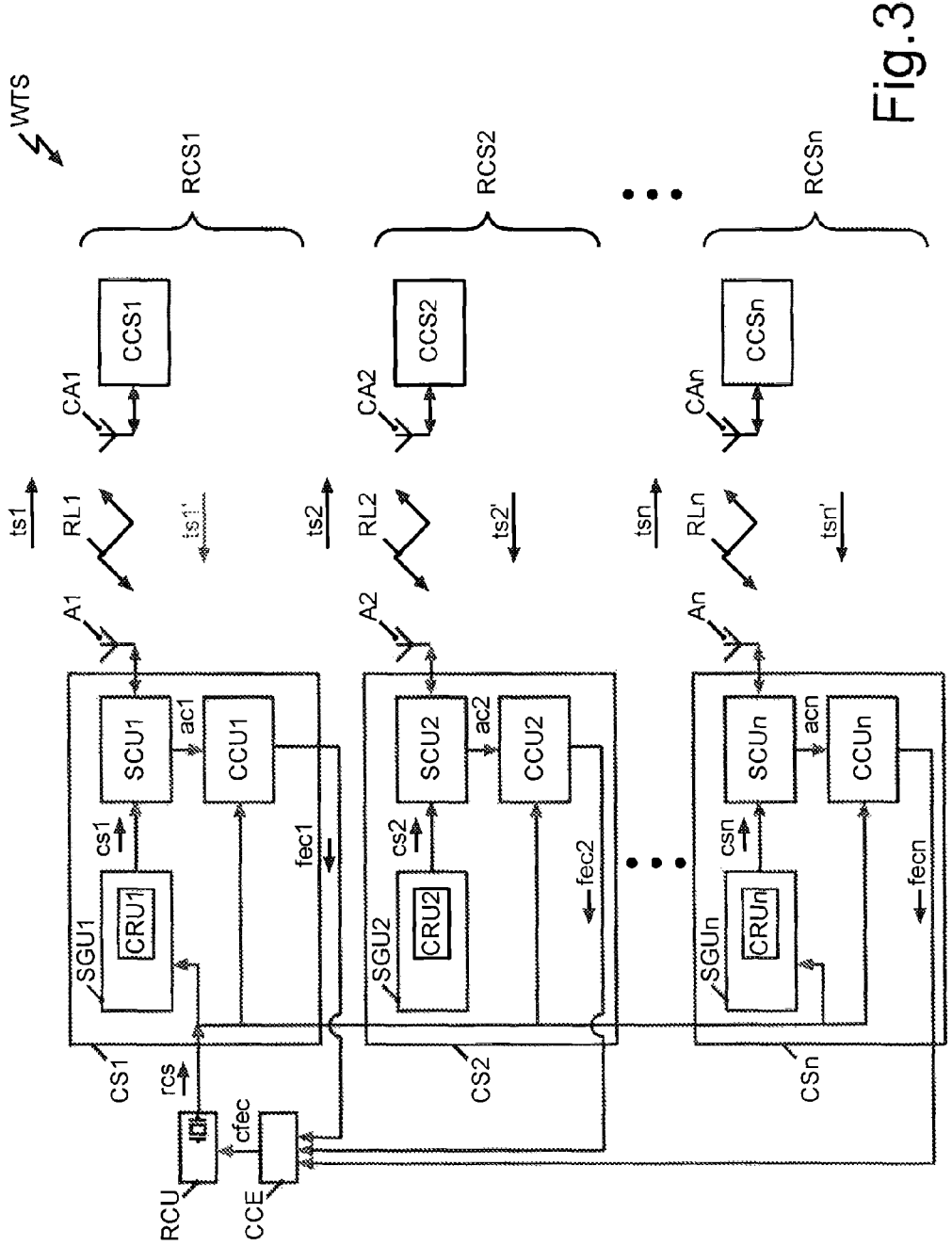
FIG. 3 shows a block diagram of multi-standard wireless communication system according to the disclosure utilizing a common reference clock unit, controlled via a clock control evaluation unit.

A first embodiment of the disclosure is depicted in FIG. 3, which shows a block diagram of a multi-standard wireless communication system WTS utilizing a common reference clock unit RCU. Each terminal communication station CS1-CSn has its own clock control unit CCU1-CCUn. The common reference clock signal rcs provided by the common reference clock unit RCU is applied to all said clock control units CCU1-CCUn within the terminal communication stations CS1-CSn of said multi-standard wireless communication terminal. Said clock control units CCU1-CCUn are attached to a common clock control evaluation unit CCE connected to the common reference clock unit RCU.

Figure 4:
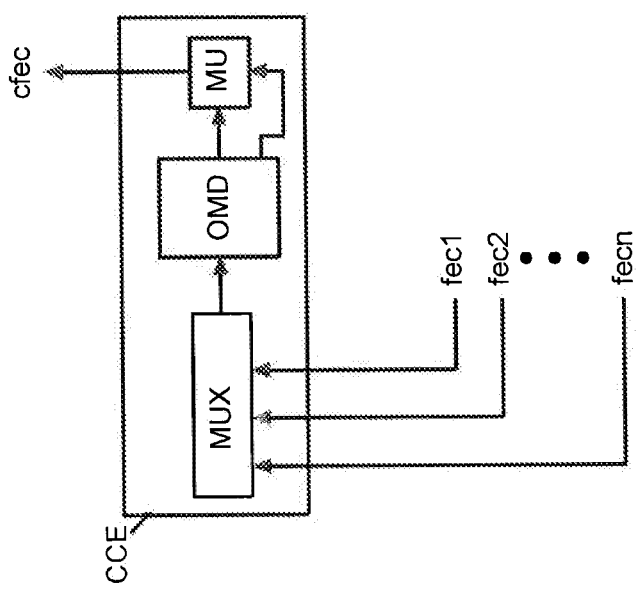
FIG. 4 shows a detailed block diagram of the clock control evaluation unit.

In FIG. 4 for example a block diagram of a common clock control evaluation unit CCE comprising a multiplexer unit MUX, an operation mode detector OMD and a memory unit MU is depicted. The frequency error control signals fec1-fecn provided by the different clock control units CCU1-CCUn are supplied to the multiplexer unit MUX of said common clock control evaluation unit CCE. Via the common clock control evaluation unit CCE, at least one control signal is derived from the frequency error control signals fec1-fecn. A prioritization of the derived control signal is executed by the common clock control evaluation unit CCE, depending on a common frequency control signal cfec created for the control of the common reference clock unit RCU. The common frequency control signal cfec is fed to the common reference clock unit RCU.

In a preferred embodiment the common frequency control signal cfec is equal to one of the frequency control signals fec1-fecn provided by the currently active terminal communication systems CS1-CSn, for example the one having the most demanding accuracy requirements, wherein the activeness of the terminal communication system CS1-CSn is determined by the operation mode detector OMD arranged between the multiplexer unit MUX and the memory unit MU.

If for instance said operation mode detector OMD detects that the most accurate terminal communication station CS1-CSn is not active within a given time period, the common clock control evaluation unit CCE selects one of the frequency control signals fec1-fecn provided by the communication station CS1-CSn having the second best accuracy, which will be provided as common frequency control signal cfec via the memory unit MU to the common reference oscillator unit RCU.

If no or no reliable frequency control signals fec1-fecn are available at all for a certain moment in time, for example due to an inactiveness of all terminal communication systems CS1-CSn, the common clock control evaluation unit CCE continually supplies the latest available common frequency control signal cfec stored in the memory unit MU to the common reference oscillator unit RCU until an updated common frequency control signal cfec can be derived from a re-activated terminal communication station CS1-CSn. All calculation and evaluation is done in the operation mode detector OMD. In one specific embodiment the memory unit MU can also be realized as a so called analog memory ("low-pass functionality").

Figure 5:
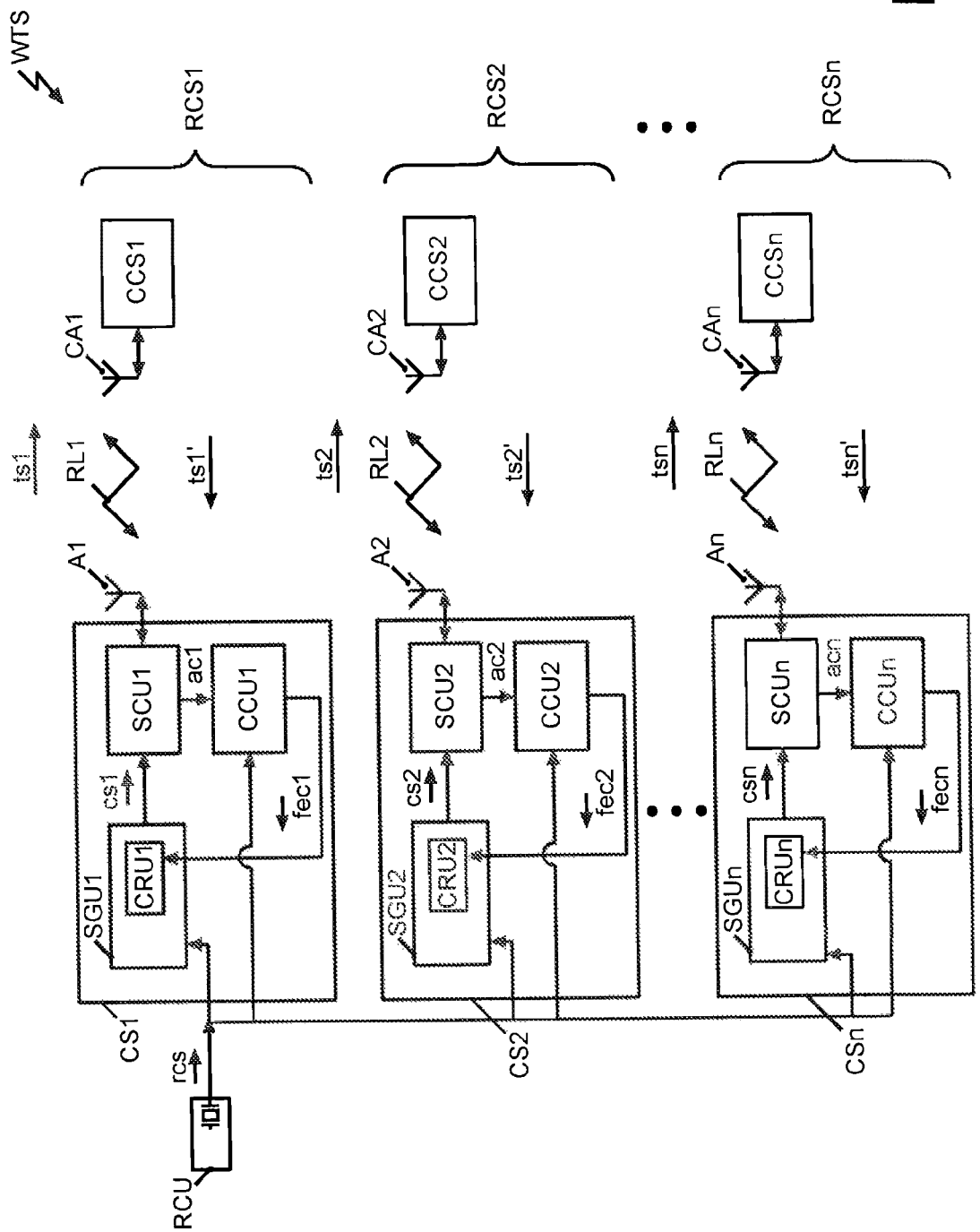
FIG. 5 shows a block diagram of a multi-standard wireless communication system according to the disclosure utilizing a common reference clock unit, where each clock control unit is controlling its signal generation unit.
Figure 6:
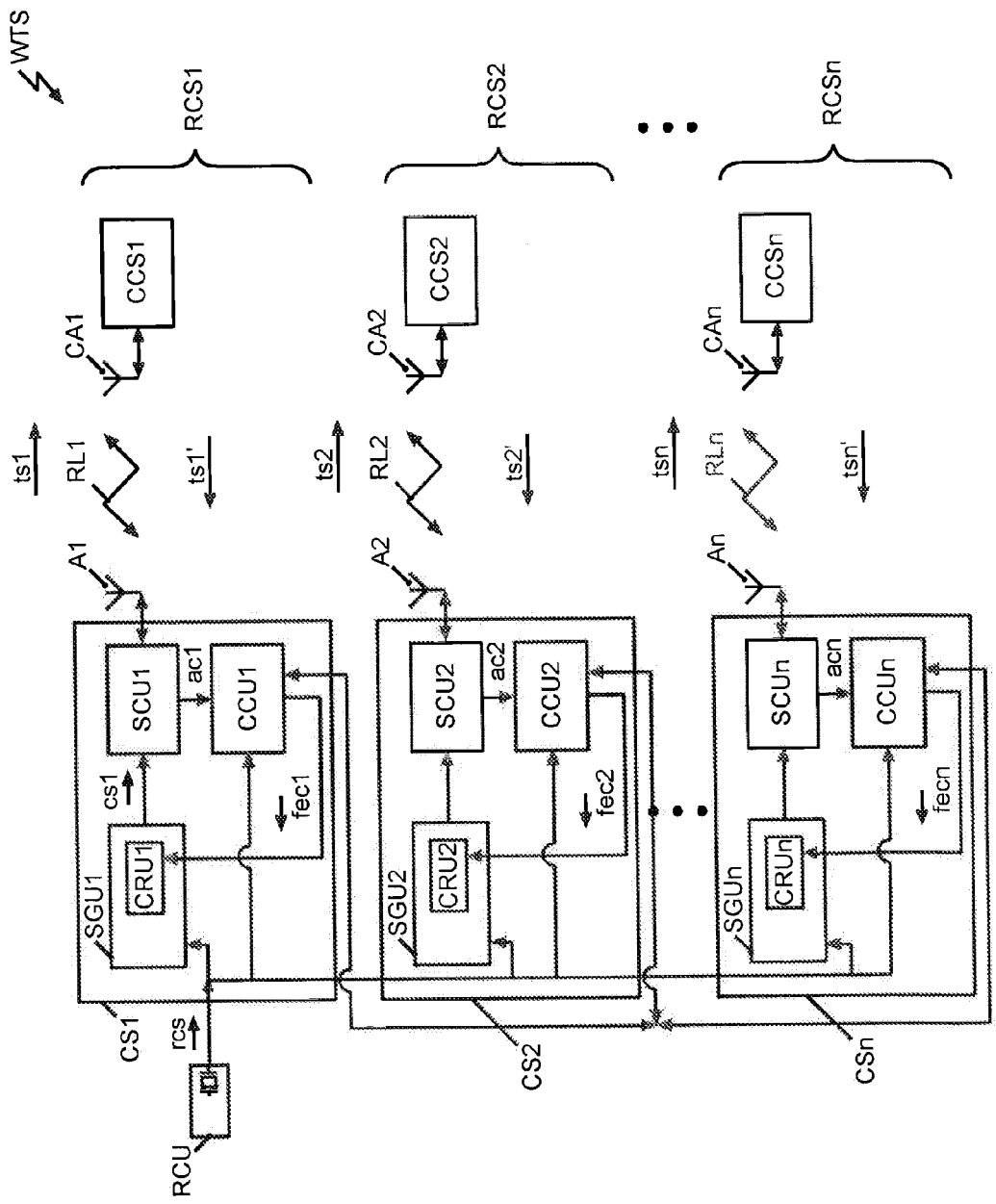
FIG. 6 shows a block diagram of an extension of the system of FIG. 5, wherein the clock control units share their frequency error knowledge among each other.
Figure 7:
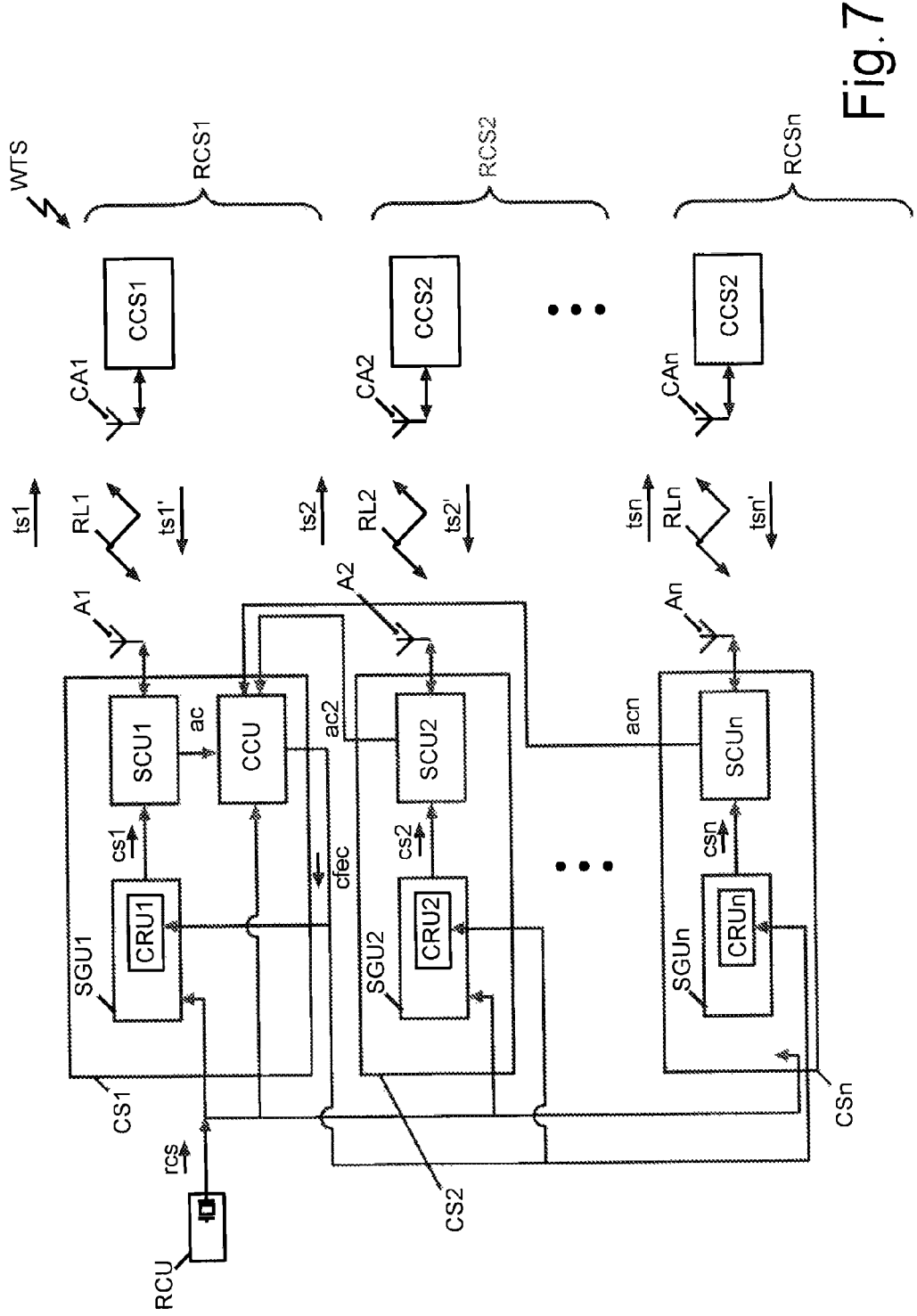
FIG. 7 shows a block diagram of a multi-standard wireless communication system utilizing a common reference clock unit as well as a common clock control section.

A second embodiment of the disclosure is depicted in FIGS. 5-7, which shows a block diagram of a multi-standard wireless communication system WTS utilizing a common reference clock unit RCU like in FIG. 3, but without a common clock control evaluation unit CCE for the evaluation of the different frequency control signals fec1-fecn provided by the clock control units CCU1-CCUn of the different terminal communication stations CS1-CSn. As before in FIG. 3, all terminal communication systems CS1-CSn are using the same common reference clock signal rcs.

According to the embodiment depicted in FIG. 5 each communication station CS1-CSn derives its own frequency error control signal fec1-fecn via the clock control unit CCU1-CCUn by comparing the common reference clock signal rcs provided by the common reference clock unit RCU and the accurate frequency datum ac1-acn extracted from the counterpart transmission signal ts1'-tsn' by the signal conversion unit SCU1-SCUn. The frequency error control signals fec1-fecn are respectively applied to the conversion ratio units CRU1-CRUn of the signal generation units SGU1-SGUn, respectively, in order to adjust the conversion ratios of said conversion ratio units CRU1-CRUn.

The frequency error control signal fec1-fecn provided by each clock control unit CCU1-CCUn forces a correction value for adjusting the conversion ratio of each conversion ratio unit CRU1-CRUn in order to correct the given frequency error/frequency offset. The calculation of the correction value for adjusting the conversion ratio is done individually in each clock control unit CCU1-CCUn in order to synchronize the terminal communication systems CS1-CSn and the counterpart communication systems CCS1-CCSn. Instead of adjusting the common reference clock signal rcs according to the first embodiment of the disclosure, in the second embodiment of FIG. 5, the conversion ratio of the conversion ratio unit CRU1-CRUn within the signal generation units SGU1-SGUn is adjusted individually.

According to an improved embodiment depicted in FIG. 6, the terminal communication systems CS1-CSn are sharing their information about the determined frequency error/frequency offset derived individually by each clock control units CCU1-CCUn among each other. This offers the possibility to use the frequency error error/frequency offset information derived by the most reliable radio link RL1-RLn and/or the most accurate terminal communication system CS1 in the residual terminal communication systems CS2-CSn. In addition to that, inactive periods of at least one terminal communication systems CS1-CSn can be bypassed by using the accurate frequency data ac1-acn of the currently active terminal communication systems CS1-CSn.

Furthermore, according to FIG. 7 a common clock control unit CCU, provided in one of the terminal communication systems CS1-CSn, creates a common frequency control signal cfec that is supplied to each of the conversion ratio units CRU1-CRUn of the signal generation units SGU1-SGUn. Said common frequency control signal cfec specifies a common correction value calculated by the common clock control unit CCU for adjusting the conversion ratio in each clock control unit CCU1-CCUn in order to synchronize to the terminal communication system CS1-CSn and the counterpart communication stations CCS1-CCSn.

Therefore the accurate frequency datum ac1-acn of the different terminal communication systems CS1-CSn are supplied to the common clock control unit CCU, which prioritizes said accurate frequency data ac1-acn and selects for example the accurate frequency datum ac1-acn of the most accurate terminal communication system CS1-CSn for the calculation of the common correction value of the creation of the common frequency control signal cfec. Also a combination of several accurate frequency data ac1-acn is possible to derive said common frequency control signal cfec.

Moreover also the principles of the common clock control evaluation unit CCE in FIG. 4 can be realized in the common clock control unit CCU of FIG. 7, which may be a prioritizing of the received accurate frequency datum ac1-acn and covering transmission gaps by using stored values etc. Therefore, said common clock control unit CCU might have a similar architecture comprising a multiplexer unit MUX, an operation mode detector OMD and a memory unit MU.

Finally, it should be noted that the above-mentioned embodiments illustrate rather than limit the disclosure, and that those skilled in the art will be capable of designing many alternative embodiments. The words "comprising" and "comprises", and the like, do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   synchronizing a plurality of terminal communication systems and a counterpart communication station coupled via a radio link within a multi-standard wireless communication system, the synchronizing including:
   transmitting a counterpart transmission signal from the counterpart communication station to a corresponding terminal communication system of the plurality of terminal communication systems;
   generating a common reference clock signal;
   supplying the common reference clock signal to a signal generation unit within the terminal communication systems, wherein each terminal communication system comprises a conversion ratio unit having a respective conversion ratio;
   deriving a plurality of accurate frequency data from a plurality of respective counterpart transmission signals via a plurality of respective signal conversion units;
   deriving a plurality of frequency control signals from the respective accurate frequency data in the respective terminal communication systems;
   deriving a common frequency control signal from the frequency control signals by prioritizing the frequency control signal provided by the terminal communication system that is most accurate and selecting the prioritized frequency control signal as the common reference clock signal;
   controlling the frequency of the common reference clock signal via the common frequency control signal; and
   obtaining synchronization between the corresponding terminal communication system and the counterpart communication station, the obtaining including at least one of:
   adapting a frequency of the common reference clock signal according to the frequency control datum; and
   adapting the conversion ratio of the conversion ratio unit of the corresponding terminal communication system according to the frequency control datum.

2. A method according to claim 1, comprising:
   sharing among the terminal communication systems at least one of the accurate frequency datum and the frequency control signal determined from the accurate frequency datum.

3. A method according to claim 1, wherein each terminal communication system includes a respective one of a plurality of signal generating units, the method comprising, for each terminal communication system, supplying the frequency control signal that was derived in the terminal communication system to the signal generation unit of the terminal communication system.

4. A method according to claim 1, comprising:
   detecting a discontinuous operation of one of the terminal communication systems; and
   applying a buffered frequency control signal while the at least one of the terminal communication systems is inactive.

5. A method according to claim 1, wherein deriving the common frequency control signal is performed by a clock control evaluation unit, the method comprising:
- selecting as the common frequency control signal whichever one of the terminal communication systems is currently active, wherein the activeness of the terminal communication systems is determined by an operation mode detector arranged within the clock control evaluation unit.

6. A method according to claim 1, comprising:
- detecting a frequency offset datum in one of the terminal communication systems by comparing said common reference clock signal with the accurate frequency datum and
- deriving the frequency control signal from the detected frequency offset datum.

7. A method, comprising:
- synchronizing a plurality of terminal communication systems and a counterpart communication station coupled via a radio link within a multi-standard wireless communication system, the synchronizing including:
- transmitting a counterpart transmission signal from the counterpart communication station to a corresponding terminal communication system of the plurality of terminal communication systems;
- generating a common reference clock signal;
- supplying the common reference clock signal to a signal generation unit within the terminal communication systems, wherein each terminal communication system comprises a conversion ratio unit having a respective conversion ratio;
- deriving a plurality of accurate frequency data from a plurality of respective counterpart transmission signals via a plurality of respective signal conversion units;
- deriving a plurality of frequency control signals from the respective accurate frequency data in the respective terminal communication systems;
- deriving the frequency control signal from the accurate frequency data provided by the signal conversion units using a common control unit—by prioritizing the accurate frequency data provided by the signal conversion units and selecting one prioritized accurate frequency datum for deriving the frequency control signal;
- controlling the conversion ratio of the conversion ratio units via the frequency control signals; and
- obtaining synchronization between the corresponding terminal communication system and the counterpart communication station, the obtaining including at least one of:
- adapting a frequency of the common reference clock signal according to the frequency control datum; and
- adapting the conversion ratio of the conversion ratio unit of the corresponding terminal communication system according to the frequency control datum.

8. A method according to claim 7, comprising:
- detecting a discontinuous operation of at least one of the terminal communication systems; and
- using a buffered frequency control signal as the frequency control signal while the at least one of the terminal communication systems is inactive.

9. A method according to claim 7, comprising:
- selecting one of the accurate frequency data provided by currently active terminal communication systems of the terminal communication systems as the frequency control signal, wherein the activeness of the terminal communication systems is determined by the common clock control unit.

* * * * *